Patented Oct. 27, 1936

2,058,596

UNITED STATES PATENT OFFICE 2,058,596

COMPOSITION OF MATTER AND METHOD OF MAKING THE SAME

Walter J. Koenig, Philadelphia, Pa.

No Drawing. Application December 7, 1932,
Serial No. 646,148

27 Claims. (Cl. 260—2)

This invention relates to a novel composition of matter, and particularly to a composition adapted for coatings, plastics and the like, in which a constituent of the vehicle is adapted to form a resin by condensation at moderately elevated temperature, and to resinous products derived from the oils, to the method of making the same and to a novel method of drying and bodying oils.

I have discovered that organic compounds having reactive linkages or reactive terminal atoms or groups in their molecular structures such as are known to form resins by condensation, polymerization, etc., can be reacted in relatively small amounts with the fatty oils which contain reactive unsaturated linkages in their molecules (herein referred to as the "drying oils") with production of tough, stable, flexible resinous products that are superior for many technical purposes to any other materials known prior to my invention.

I am aware that oils have been included in certain compositions intended to form resins by known reactions, e. g., phenol-aldehyde condensations forming resols, and poly-basic acid-polyhydric alcohol condensations forming "Glyptals". In such cases the oil has been included in the reaction mixture in a purely physical capacity as a solvent or dispersing medium or as a softening or modifying agent or diluent. No reaction of the oil has been recognized and there had been no reason to suppose that the oils themselves could be converted into desirable resins by reaction with the resin-forming compounds much less that they could be dried in films, either surface coating and protective films or adhesive films in plastic compositions, etc., by such a reaction.

It has also been suggested to react oils with certain substances capable of forming resins according to my invention, but the conditions and proportions chosen or the diluents or other ingredients suggested for inclusion in the reacting mixture have been such that the desirable results which are possible have never been recognized as possible nor become available to the art.

In contrast to such prior suggestions the objects of my invention are, among others:

To produce a variety of novel resinous products, and especially products characterized by exceptional flexibility, toughness, resistance to abrasion, to penetration by water and to chemical attack, especially by alkalies; and which retain these properties over long periods of time and wide ranges of temperature, humidity, etc.

To produce oleaginous compositions (by which I mean those which contain oil in such amount as to derive its properties noticeably or predominantly from the oil) capable of drying uniformly and without uncontrolled distortion.

To produce oleaginous compositions capable of more rapid drying than the natural oils as commonly used and under conditions easily attained, but which do not harden excessively under storage conditions.

To produce dried oleaginous compositions in colors which are relatively clear and free from such darkening as has been usually characteristic of dried oils.

To produce coated articles having a clear and permanent gloss or a soft matte as desired.

A more specific object of my invention is to provide paint coatings and plastic cements, and other like compositions which, before drying, are of suitable consistency for use in the same way as existing paints, cements, etc., and which will be relatively stable even when exposed over long periods of time to the atmosphere at normal room temperatures, but which will dry rapidly at raised temperatures, and which, when dry, will be waterproof, highly resistant to the action of alkalis, relatively hard, but tough and pliant, so that goods made of or coated with the composition may be rolled and stored indefinitely at high temperatures or low, and may be unrolled, even after long storage and even at low temperatures, without cracking or other objectionable effects.

These and the other objects of the invention will of course be attained to greater or less degree with the various condensing substances and under various conditions of treatment, but my invention makes possible, e. g., as more fully specifically set forth in this specification, the attaining of these objects to a higher degree than has heretofore been regarded as possible.

With these and other objects in view, a procedure according to my invention, broadly stated, consists of providing in the vehicle of a liquid or plastic composition a substance having resin-forming characteristics, and heating the composition at a moderately elevated temperature at which the substance condenses with the oil to form a resin, whereby the vehicle will be dried and become a binder in the dried coating or plastic, etc. The materials capable of effecting this result may be chosen from those which are known to form resins by condensation or polymerization. Numerous condensation reactions which result in the formation of resins have already been studied, and it is unnecessary here to enumerate the hundreds of compounds which may be used in this way. It is to be remembered, however, that the substances which are used according to the present invention are caused to react in situ within the composition and that before the condensation is complete, the substance is to form a portion of the vehicle, so that it should ordinarily be either a liquid or a semi-liquid, or readily miscible in a liquid constituent of the vehicle, or capable of intimate dispersion therein, e. g., by grinding like pigment. Likewise, the condensation according to the present invention should take place at a temperature which will not injure other constituents of the composition, and advantageously not at normal atmospheric temperatures. Advantageously, substantially the entire vehicle enters into the reaction, or at least enough so that the vehicle is solidified by the reaction.

The compositions which I have found most advantageous are those which include a drying oil and a resin-forming constituent which is adapted to form a resin by condensation with the drying oil. Substances which thus condense with the drying oil include organic compounds which have reactive linkages or reactive groups or atoms in their molecular structures, such as are known to form resins by condensation, polymerization, etc., and especially oxy-compounds, by which I mean to include compounds containing the hydroxyl radical, such as alcohols, hydroxy-keto compounds, phenols, etc.; ketones, aldehydes and anhydrides. Both straight chain and cyclic compounds may be used, but I have found the latter more satisfactory. Compounds containing the hydroxyl radical which exhibit resin-forming characteristics, and which are particularly suitable for use in the present invention include, for example, phenol, cyclohexanol, 4 acetyl 1-1 methyl cyclohexanol, 1.2.8-trihydroxy-hexahydro-p-cymene, and diacetone-alcohol. Ketones which are particularly suitable include cyclo-hexanone, methyl cyclohexanone, aryl-alpha-keto-tetrahydronaphthalene, homoterpenylic - methyl ketone. Of the suitable aldehydes, I prefer to use furfuraldehyde. Phthalic anhydride may be used. This list could be multiplied indefinitely, since, as is well known, numerous compounds exhibit resin-forming characteristics, i. e., are capable of forming resins by condensation either alone or with compounds present or released in the drying oils. If the purposes and principles of the invention are kept in mind, those skilled in the art will have no difficulty in selecting numerous substances which will be suitable for use as the resin-forming constituent.

I have used the term condensation herein broadly to mean the union of two or more organic substances with or without the elimination of component elements.

By oxy-cyclic compounds we mean true saturated or true unsaturated oxy-heterocyclic compounds, in which the element is oxygen, and true oxy-carbocyclic compounds, having hydroxyl, keto, aldehyde or anhydride groups. By true saturated and true unsaturated oxy-heterocyclic and true oxy-carbocyclic compounds we mean that the compounds consist of hydrogen and carbon atoms and the above named oxy groups. Of course, through this description methyl groups, etc., are included. We also include unsaturated unsubstituted heterocyclic compounds in which the element is oxygen, as such compounds will condense in accordance with the invention and apparently through an unsaturated linkage of the compounds.

I have found, furthermore, that the presence of a small proportion of a synthetic resin varnish, e. g., a phenol aldehyde condensation resin, advantageously incorporated as a varnish, or ground into the oil like a pigment, improves greatly the properties of the resulting composition, and particularly in the case where blown China-wood oil is used with one of the substances named above. In such a composition, the resin-forming constituent and the China-wood oil alone will condense satisfactorily to form a resin, but when such a composition, without other ingredients, is mixed with pigments to be used for coating purposes, it is difficult to produce a smooth, glossy film when the paint is cured, whereas the addition of the small amount of phenol-formaldehyde resin to the composition before curing results in a dried film which leaves little to be desired in appearance, pliability and permanence.

Although, as stated, such reactive resins produce extremely desirable results, they are not essential to my invention in its broader aspects, and particularly where the surface of the oil is protected against excessive oxidation, excellent condensation film may be formed even though such resin is not included in the composition.

It is not yet certainly determined whether the condensation is with the original structures of the natural oil fatty acid glyceride molecules, or with some derivative formed in the oil during storage, bodying or drying conditions. In referring herein to the oils, I intend to include such derivative products as may be present therein.

Substances which catalyze the condensation reaction may, with advantage, be included in the composition. Thus, for example, alkalis, e. g., sodium borate, or acids, e. g., acetic or nitric acid, or finely divided metals, e. g., Ni, may be included in small amounts, and when included reduce the time of curing and/or preliminary heat treatment.

Certain other materials, including zinc pigments, have been found to exert advantageous action upon the condensation, and tend to hasten the drying action.

Driers, e. g., resinates of manganese, lead, etc., may be used, but are not necessary, and unless it is permissible to increase the brittleness of the dried composition, these driers should be used only in very small amounts, e. g., a mixture of .01% of a lead drier and .001% of a manganese drier, or even less; the percentages being based on the weight of the metal constituent of the drier compared with the weight of the oil in the composition.

The following is a preferred embodiment of my invention which may be given as exemplary of the compounding and treatment of compositions embodying my invention:

| | Parts by weight |
|---|---|
| Zinc oxide | 20 |
| Lithopone | 100 |
| Barium sulphate | 100 |
| 9-second viscosity blown China-wood oil (no driers) at 86° F | 70 |
| 25 gallon phenol-formaldehyde resin-China-wood oil varnish (no driers) 35% volatile | 30 |
| Cyclohexanone | 20 |

The blown China-wood oil, varnish and the cyclohexanone are preferably mixed together and refluxed for forty minutes at 350° F. This preliminary heating causes the condensation of the China-wood oil and the cyclohexanone to begin. The condensation may be retarded or stopped at any desired point by merely cooling the reacting mass to room temperature. This treatment is not carried so far as would produce a hard resin from the oil, and the condensation of the China-wood oil and the cyclohexanone will, therefore, be only partially complete. Through this partial condensation feature and methods of control of the condensation, vehicles of any desired viscosity may be obtained to produce paints of any desired working properties or plastics. This is in contrast to most known resin-forming condensations in which the reaction mass before completion of the reaction is unsuitable for commercial uses. The refluxed vehicle is then added to the pigments and the composition ground through a roller mill. The resulting paint is one particularly adapted for printing floor coverings, e. g., on felt base goods, and has a body and properties of flow, etc., which may be favorably compared with the best print paints. When used on bituminous felt base material, I apply this paint only after a suitable face coat which serves to seal the base against the solvent action of the cyclohexanone, etc. This paint, after being applied to the floor covering material, etc., may be dried by heating to 140° F. for one day, or longer, e. g., twenty-four to forty-eight hours, after which it will be entirely free from tack, rubbery, and relatively hard, and will maintain its tough, pliant nature for long periods of time, being as tough and pliable at the end of one year, as one week after it is made. The heating described above causes the condensation reaction of the partially condensed China-wood oil and cyclohexanone to resume, and in the instant example, is carried to completion. It is, however, desired to indicate that this condensation reaction can be so controlled that the reaction may be started and retarded at any time by merely interrupting the refluxing or heating operations. This drying compares, for example, with that of the best paints which have been used before, which require from four to seven days' drying on flat racks; and, as is well known, the paints as used heretofore are likely to be somewhat tacky when first made, and to become hardened with a tendency to crack after long storage and particularly if unrolled while at low temperature.

A very important characteristic of the dried film made as described above is its resistance to alkalis. This is particularly important in floor coverings, where washing is frequently done with water containing strongly alkaline soaps, or even with lye added to the water. The paint made as described above may be immersed for four hours in 5% caustic soda solution without any recognizable deterioration. Average floor covering paints are entirely dissolved by such a solution in twelve to thirty minutes, and no paint heretofore known, which is suitable for coating floor coverings, has approached at all the alkali resistance of this paint.

In the above formula, kettle-bodied China-wood oil may be used instead of blown oil, for example, an oil which has been bodied to a viscosity of twenty-five seconds to one minute, as measured by the Gardner-Holt tube. Kettle-bodied oils bodied in air or inert atmosphere may be used satisfactorily if they are blown for a short time after being mixed with the resin-forming substance.

The drying time, surface and permanence of the dried films may be improved, and less unsaturated oils may be used if the initial condensation reaction is effected by at least a short blowing treatment, so that some oxidation occurs in the oil during this preliminary treatment, and particularly if free fatty acids of the drying oils have been added prior to the blowing treatment, or if oxidation products are added to the oil.

Other drying oils (in which term I include also the so-called semi-drying oils, and non-drying oils to which an unsaturated acid similar to the acids of the drying oils has been added, and even such drying oil fatty acids substantially without glycerides), for example, fish oil, linseed oil, and castor oil or soya bean oil to which fatty acids of China-wood or linseed oil have been added, may be used similarly to China-wood oil. It is my belief that oxidized oils, for the most part, enter the condensation reaction in the practice of this invention. I have also observed that the drying action of these compositions increases with the increased number of double bonds, and that the type of structures, when two or more double bonds are present in the straight chain, also makes a great difference. In such cases, the conjugate double bond structures, such as are present in China-wood oil, are most advantageous for the purposes of this invention, and are preferred over the structures having the interposed methylene groupings such as linolic and linolinic acids and glycerides. This also holds true in the addition of fatty acids to the composition, in which case, as would be expected from the above, the unsaturated fatty acids of China-wood oil give better results than those of linseed oil.

The conversion of non-drying oils into drying oils for the purposes of this invention,—that is, for drying by a resin-forming condensation as herein disclosed, may be effected by the addition of unsaturated fatty acids similar to those of the drying oils, as more fully described in the co-pending application of Koenig, Pohl and Walker, Serial Number 646,150 filed herewith. Even the non-drying oils, however, usually include at least one unsaturated double bond in their chemical structures and, as already indicated above, I regard this double bond as important in the condensation reaction, and, other things being equal, prefer to use the oils having a higher degree of unsaturation.

In the above composition, the cyclohexanone serves as a thinner as well as a resin-forming ingredient, and in fact some of the cyclohexanone will be lost by evaporation during the preliminary heat treatment and subsequent curing. If solid or semi-solid materials are used as the resin-forming ingredient, it may be desirable to thin the composition with other materials, and for some purposes, even the above composition may be heavier than is desirable. For this purpose, I have found cyclohexanone particularly advantageous, but petroleum thinners may be used without serious disadvantage. Other solvent thinners frequently tend to prevent gloss in the finished film, and where such a result is desirable, may be used for this purpose. Hydroterpenes, are examples of thinners which act in this way.

Driers may be used to give harder films at some cost of pliability. I prefer, however, not to use more than 0.1% of a lead drier, together with not more than .001% of a manganese drier based on the weight of the metal to the weight of the oil, but more, e. g., as much as 0.5% of lead, together with 0.02% of manganese, may be used if some degree of brittleness or tendency to crack will not be objectionable. By varying the formula, higher proportions of drier may be used without objectionable results; and where a slow condensing composition is used, a higher proportion of drier may be desirable.

The curing of such a paint film may take place at a temperature as low as 115° F., but much more satisfactory results are attained if the curing is between 130° and 140° F. Much higher temperatures may be used, and in general the rate of drying increases with increase in temperature, but if the temperature is increased much above 140° F., certain disadvantages begin to appear, and it is therefore more advantageous to maintain the curing temperature between 130° and 140° F. When the non-drying oils converted by the addition of suitable fatty acids and resin-forming substances, as described above, or the fatty acids substantially alone, are used in the present invention, the curing temperatures should be higher, and ordinarily the times also should be longer. Thus, for example, with a composition of 10 parts phenol and 100 parts China-wood oil fatty acids blown to 80° Doolittle, e. g., for one hour at 220° F., one-half pound air pressure, the drying may advantageously be carried out at about 220° F., for a period of about three and one-half hours. With a similar composition of linseed oil fatty acids, the temperature should be higher and the time longer. With soya bean oil and added China-wood oil fatty acids, e. g., 20 parts of the fatty acids, 10 parts phenol, and 100 parts soya bean oil, blown to a high viscosity, for example, three hours at 200° F., one-half pound air pressure, the drying may be satisfactorily effected in seven hours at 220° F. With a similar composition of castor oil the temperature should be somewhat higher, or the time somewhat longer.

If the film of the paint is thick, e. g., 0.6 pound per square yard, during the curing, too high a temperature may result in an irregular surface, e. g., an orange peel, or even wrinkling, and particularly on a surface such as a felt base floor covering material, there is likely to be a noticeable discoloration when too high temperatures as used in the curing. However, if the film is thin and applied to an inert base, there are no apparent objections to the use of temperatures above 140° F., and even up to 300° F. Of course, the higher temperatures are likely to give more discoloration to the paint, particularly where straight white paints are used, and such very high temperatures are not necessary for rapid drying, especially of thin films. The ideal temperature will vary for different kinds of applications.

These paints dry very rapidly at elevated temperatures in inert atmospheres, and excellent results are obtained in dry air or highly humid atmospheres. If a gloss is desired, drying should be in an inert atmosphere, or preferably in an atmosphere consisting largely of the vapor of the vehicle. The cyclohexanone specified in the preceding formula or other equivalent condensing agents have relatively low vapor pressures, and, accordingly, create the necessary non-oxidizing atmosphere which makes the favorable drying medium for a gloss finish. If drying is in open air, not confined so as to collect the vapors of the vehicle, the coating will dry with a beautiful soft matte finish. Any degree of gloss may be attained by confining the drying atmosphere more or less.

The temperature of the refluxing treatment is less important. I may, for example, use a temperature of 160° or 180°, or 200° F., with results in some respects better than with the higher temperature suggested above, but with a somewhat longer period of heating. I prefer to carry out this treatment at the boiling point of the mixture, for whatever time may be required to give the desired viscosity,—ordinarily five minutes to one and one-half hours. The rate of increase in viscosity will vary with the change of resin-forming constituent or constituents. This preliminary heat treatment serves to initiate the condensation reaction so that the subsequent curing takes place rapidly. This preliminary treatment, however, is not essential, and it is entirely practicable to mix the other ingredients with the blown oil without the preliminary heat treatment, after which the paint may be cured at the same temperatures, but for longer periods of time.

A paint is given above as one example of the invention because the invention is of great practical importance in the field of print paints for floor coverings, etc. Clear varnishes, however, may be used which may be similar to the paint, but without the pigment; and other types of composition, both fluid and plastic, may be similarly made. These compositions, whether liquid or solidified, may also be dispersed in water emulsions. Printing inks, lithograph varnishes, coatings for tin cans, etc., coating, impregnating and insulating varnishes and paints in general, protective coatings for automobiles, machinery, furniture and other articles, and plastics both for manufacture of linoleum, tiles and similar products, and for molded articles such as household utensils, decorative objects, implements, handles and numerous other articles now made of molded plastics, all may be made with compositions of my invention. A composition suitable for a plain linoleum may be as follows:

| | Parts by weight |
|---|---|
| Peruvian ochre, or other pigments | 15 |
| Wood flour | 10 |
| Ground cork | 50 |
| Gelled, or semi-solid vehicle | 60 |

This vehicle may, for example, consist of

| | Parts |
|---|---|
| Blown China-wood oil, viscosity nine seconds Gardner-Holt at 86° F | 120 |
| 25-gal. varnish (i. e. 25 gallons of China-wood oil to 100 lbs. of phenol formaldehyde resin, such as bakelite XR 420, or Durez 525) | 80 |
| Cyclohexanol | 17½ |
| Cyclohexanone | 17½ |

The ingredients of the vehicle are refluxed at about 350° F. until desired consistency is attained, and are then mixed with the other ingredients, e. g., in a German or Banbury mixer, and calendered by means of rolls, in the usual way.

For an inlaid linoleum, a similar procedure may be adopted, preferably, however, using a composition consisting of

| | Parts |
|---|---|
| Wood flour | 30 |
| Lithopone, or other pigments | 30 |
| Of the vehicle | 30 |

A liquid vehicle may be used instead of a gelled or semi-solid vehicle, as specified above. I have found that the liquid vehicle made, for example, the same as that specified above, except that the refluxing is stopped at a suitable viscosity, e. g., after thirty minutes to an hour, has tremendous wetting properties, so that a small amount can be used, and still get a suitable plastic material.

A plastic made in this manner, with a liquid binder, is highly satisfactory for many purposes, and will set up nicely when cured at temperatures of 130° F., or thereabouts. There are, however, certain practical difficulties in the use of a plastic with a liquid vehicle in connection with existing linoleum machinery, and we prefer, therefore, to use a semi-solid or gelled vehicle, which approximately corresponds in consistency to the Bedford cements, or other cements commonly used in linoleum manufacture.

Instead of refluxing the vehicle as specified above, the composition may be blown. Where a volatile condensing substance such as cyclohexanol and cyclohexanone is used, it is ordinarily preferable to reflux at the boiling point of the condensing substance, but with less volatile resin-forming constituents, the blowing may be more economical and equally satisfactory. Even with volatile materials, it may be blown instead of refluxed if a catalyst is used, e. g., finely divided aluminum, the reaction in this case being so far speeded up that the blowing treatment may be completed before excessive volatilization of the resin-forming constituent has occurred, but even in this case it may be necessary to condense the vapors of the resin-forming substance and return the condensate to the kettle, and it is preferable that the oil should be at least partially blown before the resin-forming constituent is added.

Ordinarily the condensation reaction should not be carried to completion in this preliminary treatment, and even where the product is solidified, it is not completely hardened, but will still be capable of further condensation during the final heat treatment of the linoleum or other plastic.

A suitable vehicle may consist, for example, of

| | Parts by weight |
|---|---|
| Raw China-wood oil | 100 |
| Phenol | 10–20 |
| China-wood oil fatty acids | 20–40 |

This mixture may be heated in a Bedford kettle to a temperature of about 180° F. and blown while turning the paddle at about 550 R. P. M., the treatment being continued until the vehicle has attained a semi-solid consistency about like that of Bedford cement.

The fatty acids in the above composition improve the properties of the binder, according to the amount used. Satisfactory results may be obtained with much less acid and phenol than is specified above, but the improvement resulting from increased acid and phenol fully justifies its use.

Linoleum compositions made as above described may be satisfactorily cured in three days to a week at 140° F., and in some cases even as quickly as twenty-four hours, as compared to three to six weeks with compositions which are now commonly used.

In plastics of this type, the presence of the phenol formaldehyde resin varnish is less important, since the characteristics of the film which are effected by phenol formaldehyde varnish are not apparent in the plastic product. Thus the varnish ingredient of the above composition may be omitted without substantially changing the other proportions in the formula.

In referring herein to condensation of the resin-forming substance with the oil, I do not intend to imply that all of the oil enters into the composition.

In the above specification, I have given examples and suggested certain modifications for the purpose of illustrating the invention, and without in any way attempting to exhaustively cover all the various modifications and applications of my invention. Similarly, I have expressed certain theories which I have developed in the course of my investigations and practical experience with this invention which I believe may be helpful to those who subsequently apply and extend the application of my invention. However, I have not as yet tested these theories sufficiently to set them up as certainly correct, and since the invention is in no way dependent upon the correctness of any theory which I have expressed, it is to be understood that the scope of my invention and claims is in no way limited thereby.

Although I have particularly referred to the manufacture of paints, enamels and linoleum cements, it is to be understood that other types of compositions may be made according to this invention.

I claim:

1. The method of hardening drying oil which comprises condensing a mixture in which the condensation reactants consist of oxidized drying oil having double bonds in conjugate arrangement, and an oxy-cyclic organic compound at super-atmospheric temperature.

2. The method as described in claim 1 in which driers are added to the mixture.

3. The method of hardening drying oil which comprises condensing a mixture in which the condensation reactants consist of oxidized drying oil having double bonds in conjugate arrangement, and oxy-cyclic organic compounds at super-atmospheric temperature.

4. The method as described in claim 3 in which driers are added to the mixture.

5. The method of hardening drying oil which comprises condensing a mixture in which the condensation reactants consist of oxidized drying oil having double bonds in conjugate arrangement, and an oxy-cyclic organic compound at super-atmospheric temperature, cooling the mixture and manipulating the mixture to give it its final shape which it is to maintain when hardened in a finished product, thereafter hardening the product at super-atmospheric temperature.

6. The method as described in claim 5, in which the hardening of the shaped product occurs in an atmosphere substantially devoid of oxygen.

7. The method as described in claim 5, in which the hardening of the shaped product occurs at temperatures between 115° and 300° F.

8. The method as described in claim 5 in which the condensation between the oil and the oxy-cyclic compound is sufficient to cause the shaped mixture to dry under conditions inadequate to effect drying by mere oxidation and polymerization in the same time.

9. The method of hardening drying oil which comprises condensing a mixture in which the condensation reactants consist of oxidized drying oil having double bonds in conjugate arrangement, and oxy-cyclic organic compounds at super-atmospheric temperature, cooling the mixture and manipulating the mixture to give it its final shape which it is to maintain when hardened in a finished product, thereafter hardening the product at super-atmospheric temperature.

10. The method as described in claim 9, in which the hardening of the shaped product occurs in an atmosphere substantially devoid of oxygen.

11. The method as described in claim 9, in which the hardening of the shaped product occurs at temperatures between 115° and 300° F.

12. The method as described in claim 9, in which the condensation between the oil and the oxy-cyclic compounds is sufficient to cause the shaped mixture to dry under conditions inadequate to effect drying by mere oxidation and polymerization in the same time.

13. The method of hardening drying oil into a tough, elastic film which comprises condensing a mixture in which the condensation reactants consist of oxidized drying oil having double bonds in conjugate arrangement, and an oxy-cyclic organic compound at super-atmospheric temperature until a desired viscosity is obtained, shaping the thus bodied mixture into the form desired of the hardened film, and finally heating the film at super-atmospheric temperature until hardening is complete.

14. The method as described in claim 13, in which the temperature to condense the mixture to the desired viscosity is between 160° and 350° F., and the final temperature to harden the shaped film is between 115° and 300° F.

15. The method as described in claim 13, in which the oxy-cyclic compound is cyclohexanol.

16. The method as described in claim 13, in which the oxy-cyclic compound is cyclohexanone.

17. The method as described in claim 13, in which the final step of heating the shaped film occurs in an atmosphere substantially devoid of oxygen.

18. The method as described in claim 13, in which the hardening action of the film is carried on in a substantial atmosphere of gases given off by the shaped mixture.

19. The method of hardening drying oil into a tough, elastic film which comprises condensing a mixture in which the condensation reactants consist of oxidized drying oil having double bonds in conjugate arrangement, and oxy-cyclic organic compounds at super-atmospheric temperature until a desired viscosity is obtained, shaping the thus bodied mixture into the form desired of the hardened film, and finally heating the film at super-atmospheric temperature until hardening is complete.

20. The method as described in claim 19, in which the final step of heating the shaped film occurs in an atmosphere substantially devoid of oxygen.

21. The method as described in claim 19, in which the hardening action of the film is carried on in a substantial atmosphere of gases given off by the shaped mixture.

22. A composition of matter which comprises a condensed mixture in which the condensation reactants consist of oxidized drying oil having double bonds in conjugate arrangement, and an oxy-cyclic organic compound.

23. A composition of matter comprising a condensation mixture in which the condensation reactants consist of oxidized drying oil having double bonds in conjugate arrangement and oxy-cyclic organic compounds.

24. A tough and hardened drying oil product characterized by its alkali-resistance and flexibility, which comprises a condensed mixture in which the condensation reactants consist of drying oil having double bonds in conjugate arrangement and an oxy-cyclic organic compound.

25. A tough and hardened drying oil product characterized by its alkali-resistance and flexibility, which comprises a condensed mixture in which the condensation reactants consist of drying oil having double bonds in conjugate arrangement and oxy-cyclic organic compounds.

26. A sheet material comprising a flexible base and a surface coating of a hardened paint, said paint comprising a condensed mixture in which the condensation reactants consist of oxidized oil having double bonds in conjugate arrangement and an oxy-cyclic organic compound, said product being characterized in having greater pliability, improved alkali-resistance, less discoloration and decreased drying time.

27. A sheet material comprising a flexible base and a surface coating of a hardened paint, said paint comprising a condensed mixture in which the condensation reactants consist of oxidized oil having double bonds in conjugate arrangement and oxy-cyclic organic compounds, said product being characterized in having greater pliability, improved alkali-resistance, less discoloration and decreased drying time.

WALTER J. KOENIG.